United States Patent
Gaza et al.

(10) Patent No.: US 9,355,127 B2
(45) Date of Patent: May 31, 2016

(54) FUNCTIONALITY OF DECOMPOSITION DATA SKEW IN ASYMMETRIC MASSIVELY PARALLEL PROCESSING DATABASES

(71) Applicant: International Business Machines Corporation, Armonk, NY (US)

(72) Inventors: Lukasz Gaza, Jankowice (PL); Artur M. Gruszecki, Kraków (PL); Tomasz Kazalski, Krakow (PL); Grzegorz S. Milka, Janow (PL); Konrad Krzysztof Skibski, Krakow (PL); Tomasz Stradomski, Będzin (PL); Natalya A. Yanayt, Leominster, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/650,863

(22) Filed: Oct. 12, 2012

(65) Prior Publication Data
US 2014/0108459 A1   Apr. 17, 2014

(51) Int. Cl.
G06F 17/30   (2006.01)

(52) U.S. Cl.
CPC .... *G06F 17/30289* (2013.01); *G06F 17/30584* (2013.01)

(58) Field of Classification Search
USPC ......... 707/602, 603, 610, 635, 638, 640, 646, 707/647, 650, 670, 692, 694, 696, 698, 703, 707/713, 737, 736, 747, 764, 791, 792, 793, 707/796, 825, 900.002, 900.003, 999.101, 707/999.102, 999.107
See application file for complete search history.

(56) References Cited

U.S. PATENT DOCUMENTS

| | | | |
|---|---|---|---|
| 5,325,500 A * | 6/1994 | Bell et al. .................. | 711/157 |
| 5,440,732 A | 8/1995 | Lomet et al. | |
| 5,448,727 A * | 9/1995 | Annevelink | |
| 5,806,058 A | 9/1998 | Mori et al. | |
| 5,857,182 A * | 1/1999 | DeMichiel et al. | |
| 5,870,747 A | 2/1999 | Sundaresan | |
| 6,125,370 A * | 9/2000 | Courter et al. | |
| 6,279,004 B1 | 8/2001 | Lee et al. | |
| 6,363,389 B1 * | 3/2002 | Lyle et al. ................. | 707/695 |
| 7,299,243 B2 | 11/2007 | Maxfield | |
| 7,457,784 B2 | 11/2008 | Hashimoto et al. | |
| 7,580,941 B2 * | 8/2009 | Narasayya et al. | |
| 7,711,741 B2 * | 5/2010 | Lawler et al. ............. | 707/756 |
| 7,890,507 B2 * | 2/2011 | Kilroy ....................... | 707/736 |
| 8,364,677 B2 * | 1/2013 | Brodfuehrer et al. ..... | 707/737 |
| 2003/0074348 A1 * | 4/2003 | Sinclair et al. ............ | 707/2 |

(Continued)

*Primary Examiner* — Jay Morrison
*Assistant Examiner* — Ken Hoang
(74) *Attorney, Agent, or Firm* — Gates & Cooper LLP

(57) ABSTRACT

Database queries are optimized through the functionality of decomposition data skew in an asymmetric massively parallel processing database system. A table having data skew is restructured by (1) storing original data values of a distribution key in a special switch column added to the table, (2) replacing the original data values of the distribution key with modified data values such as randomly generated data values, and (3) partitioning the rows across the nodes of the asymmetric massively parallel processing database system based on the distribution key. The original data values that are stored and replaced may only comprise a subset of the original data values that cause data skew in the table. Data skew is reduced, which improves performance, yet the original data values remain available, which reduces the impact on collocated joins.

12 Claims, 5 Drawing Sheets

(56) References Cited

U.S. PATENT DOCUMENTS

| | | | |
|---|---|---|---|
| 2005/0131893 A1* | 6/2005 | Von Glan | 707/5 |
| 2009/0150336 A1* | 6/2009 | Basu et al. | 707/2 |
| 2009/0248617 A1* | 10/2009 | Molini | 707/2 |
| 2010/0030995 A1* | 2/2010 | Wang et al. | 711/173 |
| 2011/0231447 A1* | 9/2011 | Starkey | 707/792 |
| 2012/0036165 A1* | 2/2012 | Driesen et al. | 707/803 |

\* cited by examiner

| Query | ORDERS_V | ORDERS | random | organized by O_ORDERKEY | organized by C_CUSTKEY | ordered by C_CUSTKEY |
|---|---|---|---|---|---|---|
| 1 | 0m5.744s | 0m28.429s | 0m5.581s | 0m23.165s | 0m28.323s | 0m34.447s |
| 2 | 0m10.558s | 0m29.027s | 0m43.673s | 0m29.037s | 0m29.087s | 0m34.453s |
| 3 | 1m29.108s | 3m5.211s | 1m33.757s | 1m49.473s | 1m51.030s | 1m54.807s |
| 4 | 0m1.976s | 0m26.934s | 0m2.886s | 0m26.601s | 0m26.956s | 0m31.891s |
| 5 | 0m3.163s | 0m16.463s | 0m3.192s | 0m20.446s | 0m26.556s | 0m31.751s |
| 6 | 0m2.777s | 0m16.341s | 0m4.629s | 0m20.465s | 0m14.933s | 0m2.566s |
| 7 | 0m9.621s | 0m39.632s | 0m11.594s | 0m35.524s | 0m35.608s | 0m40.669s |
| 8 | 1m22.355s | 1m29.304s | 1m3.491s | 1m21.422s | 1m21.407s | 1m26.560s |

FIG. 5A

| Query | ORDERS_V | ORDERS | random | organized by O_ORDERKEY | organized by C_CUSTKEY | ordered by C_CUSTKEY |
|---|---|---|---|---|---|---|
| 1 | 0m5.997s | 0m18.071s | 0m5.870s | 0m18.243s | 0m18.271s | 0m21.367s |
| 2 | 0m14.544s | 0m21.494s | 1m12.414s | 0m21.440s | 0m20.447s | 0m21.619s |
| 3 | 1m10.131s | 1m25.603s | 1m26.157s | 1m25.323s | 1m26.661s | 1m25.866s |
| 4 | 0m1.448s | 0m15.526s | 0m1.622s | 0m15.479s | 0m15.444s | 0m17.510s |
| 5 | 0m1.882s | 0m16.534s | 0m1.827s | 0m16.050s | 0m15.977s | 0m17.305s |
| 6 | 0m4.304s | 0m17.915s | 0m5.407s | 0m17.895s | 0m17.104s | 0m4.051s |
| 7 | 0m9.323s | 0m21.786s | 0m8.916s | 0m21.771s | 0m21.560s | 0m24.314s |
| 8 | 0m42.665s | 0m49.845s | 0m42.590s | 0m48.722s | 0m48.653s | 0m50.569s |

FIG. 5B ies through the functionality of decomposition data skew in asymmetric massively parallel processing databases.

FUNCTIONALITY OF DECOMPOSITION DATA SKEW IN ASYMMETRIC MASSIVELY PARALLEL PROCESSING DATABASES

BACKGROUND OF THE INVENTION

1. Field of the Invention

This invention relates in general to database management systems performed by computers, and in particular, to the functionality of decomposition data skew in asymmetric massively parallel processing databases.

2. Description of Related Art

Computer systems incorporating Relational DataBase Management System (RDBMS) software using a Structured Query Language (SQL) interface are well known in the art. The SQL interface has evolved into a standard language for RDBMS software and has been adopted as such by both the American Nationals Standard Institute (ANSI) and the International Standards Organization (ISO).

Achieving interactive response time for data and/or logic intensive queries in decision support, on-line analytical processing, and data mining applications of an RDBMS is a key challenge for commercial database management systems. Parallel query execution is the best hope for achieving this goal.

One method of achieving parallel query execution is through the exploitation of database partitioning. Using the partitions of the database, queries can be deconstructed into subtasks based upon the partitioning of the database. These subtasks are executed in parallel by nodes of the RDBMS, wherein each subtask is executed by a node that manages a partition of the database. Typically, the results of these subtasks are merged for delivery to a requesting application.

Optimization choices regarding how a query is deconstructed into subtasks may be determined by the partitions of the database. Often, the optimization is dependent on the partitions being equally spaced across the nodes to ensure that all subtasks complete in essentially the same amount of time. Absent such spacing, the amount of time to complete the query is dependent on the slowest subtask.

There is a need in the art for general query optimization strategies that take into account prior partitioning as a general distribution property of database tables. Specifically, there is a need in the art for techniques that equally space partitions across nodes to ensure that parallel RDBMS operations can be carried out without delay. The present invention satisfies this need.

SUMMARY OF THE INVENTION

To overcome the limitations in the prior art described above, and to overcome other limitations that will become apparent upon reading and understanding the present specification, the present invention discloses a method, apparatus, and article of manufacture for optimizing database queries through the functionality of decomposition data skew in an asymmetric massively parallel processing database system. A table having data skew is restructured by: (1) storing original data values of a distribution key in a switch column added to the table, (2) replacing the original data values of the distribution key with modified data values such as randomly generated data values, and (3) partitioning the rows of the table across the nodes of the asymmetric massively parallel processing database system based on the distribution key with the modified data values. The original data values that are stored and replaced may only comprise a subset of the original data values that cause the data skew in the table. Data skew is reduced, which improves performance, yet the original data values remain available, which reduces the impact for collocated joins.

BRIEF DESCRIPTION OF THE DRAWINGS

Referring now to the drawings in which like reference numbers represent corresponding parts throughout:

FIGS. 5A and 5B are tables showing results from queries, wherein FIG. 5A shows the results for a bigger skew and FIG. 5B shows the results for a smaller skew.

DETAILED DESCRIPTION OF THE INVENTION

In the following description, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention describes optimizing database queries through the functionality of decomposition data skew in an asymmetric massively parallel processing database system. A table having data skew is restructured by: (1) storing original data values of a distribution key in a switch column added to the table, (2) replacing the original data values of the distribution key with modified data values such as randomly generated data values, and (3) partitioning the rows of the table across the nodes of the asymmetric massively parallel processing database system based on the distribution key. The original data values that are stored and replaced may only comprise a subset of the original data values that cause the data skew in the table. Data skew is reduced, which improves performance, yet the original data values remain available, which reduces the impact for collocated joins.

Hardware and Software Environment

Figure 1:
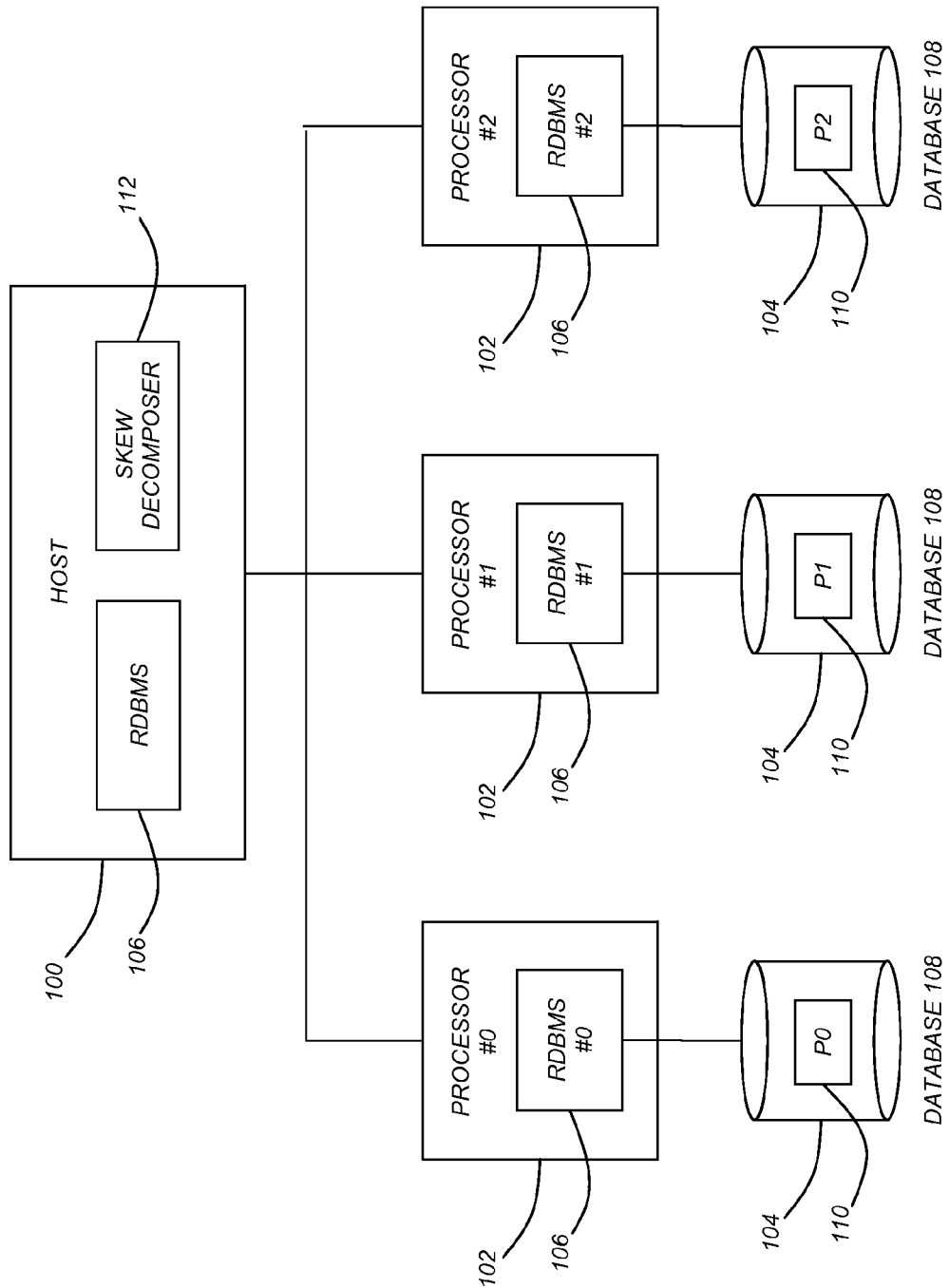
FIG. 1 illustrates an exemplary computer software and hardware environment that could be used with one embodiment of the present invention.

The present invention may be implemented in an Asymmetric Massively Parallel Processing (AMPP) architecture that combines elements of a Symmetric Multiprocessing (SMP) front-end connected to a shared-nothing Massively Parallel Processing (MPP) back-end for analyzing large amounts of data quickly. In one embodiment, the AMPP architecture implements a relational database management system (RDBMS) as shown in FIG. 1, wherein the SMP front-end includes one or more hosts 100 and the MPP back-end includes one or more nodes that are each comprised of processors 102 and data storage devices 104.

The hosts 100 are servers that present a standardized interface to external tools and applications. Using the RDBMS 106, the hosts 100 create optimized query plans from SQL queries, compile the query plans into executable code segments called snippets, and then schedule and distribute the snippets to the nodes of the MPP back-end for execution in parallel.

The RDBMS 106 performed by the processors 102 execute the snippets to access data from the database 108 stored on the data storage devices 104 and to perform functions on that data, and then return the results of those functions to the hosts 100, which assembles the results received from each of the nodes into an aggregated whole for completion of the SQL queries.

The tables of a relational database 108 may be either horizontally or vertically partitioned 110 across the nodes of the MPP back-end. Parallelism of RDBMS 106 operations is achieved by dividing the work among nodes managing the partitions 110 of relevant tables, preferably so that the snippets executed by the RDBMS 106 are directed to the partitions 110 stored locally on the associated data storage devices 104.

Data Skew in an AMPP Architecture

The performance of the AMPP architecture is strongly linked to the distribution of the database 108 across all parallel elements, namely the nodes of the MPP back-end. When the data for a given table are uniformly distributed, the processing of a query can be performed in parallel by each of the nodes in approximately the same amount of time. However, when one or more of the nodes of the MPP back-end has more of the required data, then that node requires more time to process its portion of the query, and thus becomes a bottleneck for whole system.

There is a special mechanism known as a "distribution key" that is used to enforce a uniform distribution of the data for a given table across the nodes. The distribution key identifies one or more columns of a table to be used for distribution of the rows across the nodes. Using the distribution key, a hash algorithm may be used by the RDBMS 106 to propagate the rows across the nodes, wherein the hash algorithm generates a hash value from the data value stored in the distribution key that is an identifier of the node on which to store the row.

It is necessary to choose the proper columns for the distribution key. Preferably, the columns exhibit a range of values that ensure a uniform distribution of data across the nodes. Such distribution keys can be fairly easily determined initially when the table is created, or during a manual configuration by a database administrator.

However, as a table increases in size over time, as data is added to the table, the distribution key often becomes progressively less uniform. This situation is known as "data skew" and it can strongly impact performance.

The following is an example of data skew for a table ORDERS using the C_CUSTKEY column as a distribution key, where the table has over 1,200,000,000 rows.

Consider, first, the following query over the ORDERS table:

```
select distinct C_CUSTKEY, count (*)
from ORDERS
group by C_CUSTKEY
order by 2 desc
limit 10
```

The results of this query over the ORDERS table are provided below:

| C-CUSTKEY | COUNT |
|---|---|
| 4 | 183,626,702 |
| 1 | 183,608,939 |
| 2 | 179,667,222 |
| 3 | 77,405,173 |
| 65842514 | 68 |
| 95842513 | 68 |
| 103723708 | 64 |
| 72855797 | 64 |
| 102855796 | 62 |
| 72855797 | 62 |

The above results illustrate data skew for a table ORDERS using the C_CUSTKEY column as a distribution key, wherein data skew is caused by its 4 most frequent values, namely 4, 1, 2, 3. Specifically, the 4 most frequent values in the distribution key cause most of the rows of the ORDERS table to be stored on at most 4 nodes of the MPP back-end. This data skew means that the nodes will not complete their processing at the same time, and the system will wait on the nodes storing the rows of the ORDERS table having the 4 most frequent values in the distribution key.

One possible solution to such data skew is to redistribute the data using another key or randomly. While this may solve the problem of data skew, it can create performance problems for queries with a collocated join. A collocated join comprises a JOIN of two tables distributed on the joining column that is performed within one node. Thus, changing the distribution of either table may result in data redistribution during query processing.

Figure 2:
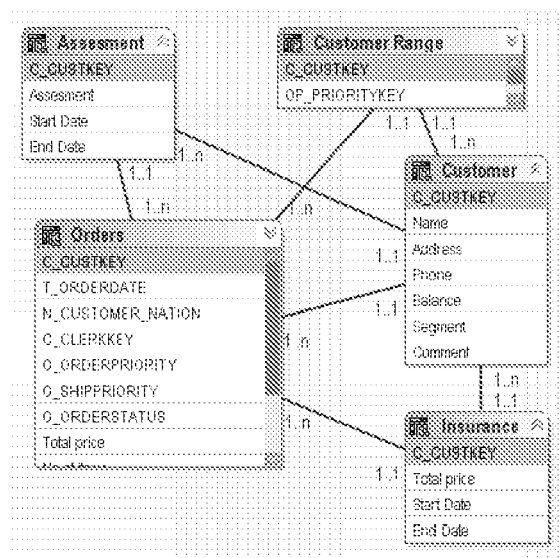
FIG. 2 shows a schema and relations between multiple tables that are related through a distribution key column.

For example, FIG. 2 shows a schema and relations between multiple tables, that are all related through the C_CUSTKEY column. If all of the tables are distributed based on the C_CUSTKEY column as the distribution key, then changing the distribution key for the table ORDERS, because it is data skewed, will impact the performance for all queries in that schema, especially all joining operations using the C_CUSTKEY column as the joining column.

Another possible solution to the data skew problem is to restructure the table by (1) modifying the data values inside the distribution key and (2) adding a switch column instead of changing the distribution key. Specifically, the most frequent values of the distribution key are replaced by modified data values for use by the hashing algorithm, while the switch column stores the original value of the distribution key for use by the queries.

Preferably, these aspects of the present invention are transparent to the end user, and are performed solely within the system itself (and known only to database administrators, for example). Moreover, the steps or functions for restructuring the table can be performed automatically or manually by the present invention, after detection of data skew.

The benefits of this approach include the following:
  data skew is reduced, which can strongly affect the performance and the parallel usage of the nodes of the MPP back-end, and
  the original value of the distribution key remains unchanged, and stored in the special switch column, which reduces the impact for collocated joins, because there is limited data redistribution.

Skew Decomposer

The present invention includes a process known as a Skew Decomposer 112, which may comprise a process separate from the RDBMS 106 as shown in FIG. 1, or which may comprise a function embedded within the RDBMS 106, or which may comprise SQL statements interpreted by the RDBMS 106, or which may comprise a stored procedure or user-defined function performed by the RDBMS 106.

The Skew Decomposer 112 is responsible for performing a periodic table analysis (i.e., data skew detection) and table restructuring should data skew be detected. The periods and triggers for executing the Skew Decomposer 112 are configurable.

In one embodiment, the Skew Decomposer 112 can be initiated by a dedicated command to the RDBMS 106, such as:

skew_decompose [table_name]

To support the Skew Decomposer 112, a new flag "skew decomposition" is added to the database 108 metadata. When this flag is present in the metadata of a table, RDBMS 106 functionality for queries, inserts, updates, deletes, etc., is altered to account for fact that the most frequent values of the distribution key are replaced by modified data values for use by the hashing algorithm, while the switch column stores the original value of the distribution key for use by the queries.

Figure 3:
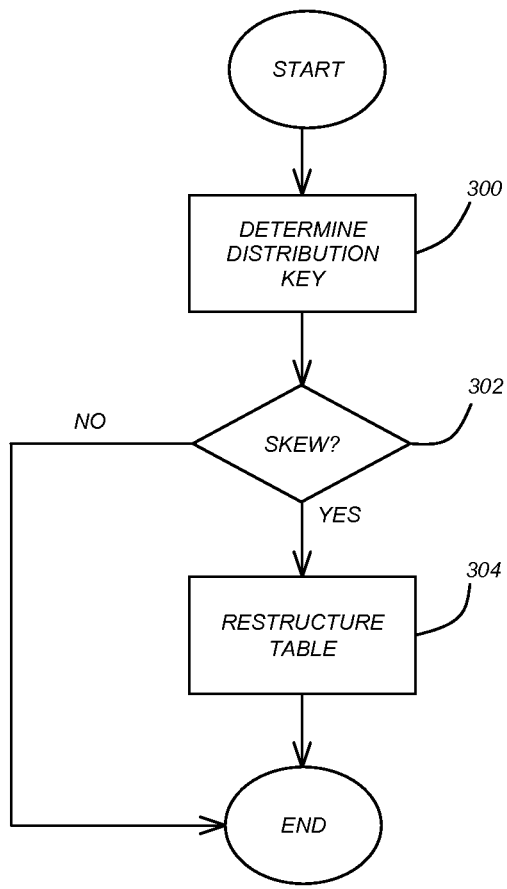
FIG. 3 is a flowchart that illustrates the steps or functions performed by a Skew Decomposer process in determining whether data skew exists, according to one embodiment of the present invention.

FIG. 3 is a flowchart that illustrates the steps or functions performed by the Skew Decomposer 112 in determining whether data skew exists in an examined table, according to one embodiment of the present invention.

Block 300 represents the Skew Decomposer 112 determining the distribution key for examined table, by accessing the database 108 dictionary.

Block 302 is a decision block that represents the Skew Decomposer 112 determining whether data skew exists for the examined table. Specifically, the Skew Decomposer 112 determines the cardinality or count of each value in the distribution key column of the examined table, and calculates a percentage for the cardinality over the total number of rows in the examined table. If there are any values in the distribution key column with a percentage above a specified percentage skew threshold, then control transfers to Block 304; otherwise, the process ends. The output of Block 302 is a list of values in the distribution key column with a percentage above the specified percentage skew threshold, which is used as the input for Block 304.

Block 304 represents the Skew Decomposer 112 performing the table restructuring using the list of values. This is further described in the flow chart of FIG. 4.

Figure 4:
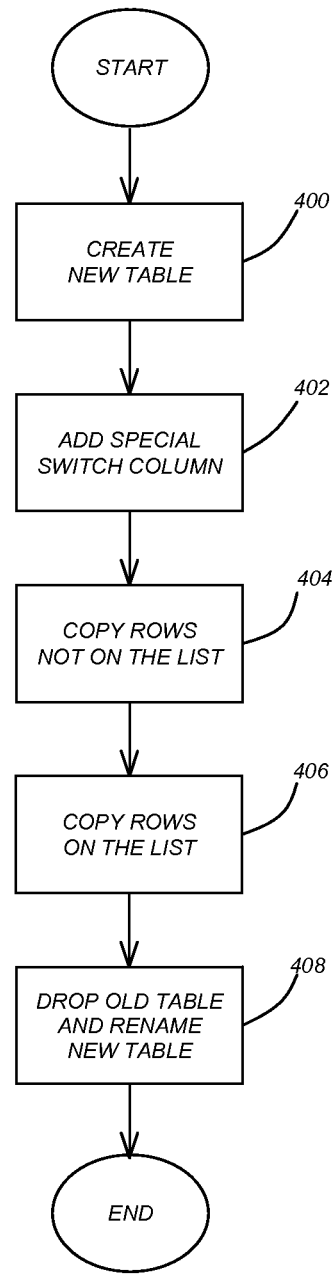
FIG. 4 is a flowchart that illustrates the steps or functions performed by the Skew Decomposer process in restructuring a table, according to one embodiment of the present invention.

FIG. 4 is a flowchart that illustrates the steps or functions performed by the Skew Decomposer 112 in performing the table restructuring, according to one embodiment of the present invention.

Block 400 represents the Skew Decomposer 112 creating a new table with an identical schema and metadata of the examined table.

Block 402 represents the Skew Decomposer 112 adding a switch column to the new table, where the switch column is a technical or hidden column of the new table. Specifically, in one embodiment, this column will be not be visible to a normal user, although it may be visible to a database administrator or other privileged user.

Block 404 represents the Skew Decomposer 112 copying all rows from the examined table to the new table for which the values in distribution key column are not in the list of values, i.e., are not in the list of values in the distribution key column with a percentage above the specified percentage skew threshold.

Block 406 represents the Skew Decomposer 112 copying all rows from the examined table to the new table for which the data values in distribution key column are in the list of values, i.e., are in the list of data values in the distribution key column with a percentage above the specified percentage skew threshold. In this Block, the copying requires special functions, namely, the data values in the distribution key column are copied to the switch column and a modified data value is stored into the distribution key column. In one embodiment, the modified data value is a randomly generated value. Moreover, the modified data value may be a negative value, which will hash normally, but the negative sign acts as a flag to indicate that it is a modified data value. Note that the modified data values may be other than randomly generated data values, such as values intended to generate particular hash values, sequential values, etc.

Block 408 represents the Skew Decomposer 112 dropping the examined table, and renaming the new table as the examined table. This Block may also modify the database 108 metadata for new table by adding a flag to the metadata for the table indicating that "skew decomposition," i.e., table restructuring, has been performed. Of course, the RDBMS 106 would need to be aware of that added flag, so that RDBMS 106 operations against the table are performed using the switch column rather than the distribution key column.

Exemplary SQL Statements

The functionality for resolving decomposition data skew according to the present invention can be easily explained using the example set forth above along with exemplary SQL statements. In the example, table ORDERS is distributed based on the C_CUSTKEY column as the distribution key with over 1,200,000,000 of rows of data, wherein data skew is caused by its 4 most frequent values.

The present invention resolves this problem by (a) problem detection, (b) table restructure, and (c) cover restructure by the view, which can be performed using exemplary SQL statements, as described in more detail below.

(a) Problem Detection

The skew problem can be determined by the following query:

```
select distinct C_CUSTKEY as GRP,
(count(*)::real/max (CNT)*100 as GRP_PRCNT
from ORDERS,
(select count(*) as CNT from ORDERS) _TOTAL
group by 1
order by 2 desc
limit 4
```

The results of this query are provided in the table below:

| GRP | GRP_PRCNT |
| --- | --- |
| 4 | 14.221397731039 |
| 1 | 14.220022266479 |
| 2 | 13.91474596181 |
| 3 | 5.9948241206633 |

The above table identifies the most frequent values (GRP) of the C_CUSTKEY distribution key in the ORDERS table by their percentages (GRP_PRCNT) of the 1,200,000,000 rows, namely the values of 4, 1, 2 and 3.

One of skill in the art will recognize that the table, column and limits are parameters that can change depending on the situation being analyzed.

(b) Table Restructure

After detecting the most frequent values of the distribution key, the table can be restructured. This restructuring can be done in-place (alter and update), or by creating a new table with the proper changes.

Specifically, the following steps are performed:
Create a new table or alter the existing table:
    Add a special switch column.
    The distribution is the same as the original table.
Insert into the new table or update the existing table:
    All rows not containing the most frequent values of the distribution key.
    All rows containing the most frequent values of the distribution key with changes applied to the distribution key, avoiding the skew.

The following exemplary SQL statements describe how the steps may be performed.

First, the following SQL is used to create a new table with an additional column:

```
create table ORDERS2 (O_ORDERKEY INTEGER,
C_CUSTKEY INTERGER,T_ORDERDATE INTEGER,
N_CUSTOMER_NATION INTEGER, C_CLERKKEY INTEGER,
O_ORDERPRIORITY INTEGER, O_SHIPPRIORITY INTEGER,
O_ORDERSTATUS CHARACTER (1), O_TOTALPRICE NUMERIC
(15,2), LI_NO_OF_ITEMS INTEGER, LI_SUM_OF_DISCOUNTS
NUMERIC (15,2), LI_SUM_OF_EXTENDEDPRICE NUMERIC
(15,2), LI_SUM_OF_TAX NUMERIC (15,2), SWITCH_KEY INT)
distribute on (C_CUSTKEY);
```

Next, all rows not containing the most frequent values of the distribution key are inserted into the new table or update the existing table:

```
insert into "ORDERS2"
    select O_ORDERKEY, C_CUSTKEY, T_ORDERDATE,
N_CUSTOMER_NATION, C_CLERKKEY, O_ORDERPRIORITY,
O_SHIPPRIORITY, O_ORDERSTATUS, O_TOTALPRICE,
LI_NO_OF_ITEMS, LI_SUM_OF_DISCOUNTS,
LI_SUM_OF_EXTENDEDPRICE, LI_SUM_OF_TAX, 0
    from ORDERS
    where C_CUSTKEY not in (1,2,3,4);
INSERT 0 666892080
```

Then, all rows containing the most frequent values of the distribution key with changes applied to the distribution key, avoiding the skew, are inserted into the new table:

```
insert into "ORDERS2"
    select O_ORDERKEY, -1* row number ( ) over (order by
O_ORDERKEY) as C_CUSTKEY, T_ORDERDATE,
N_CUSTOMER_NATION, C_CLERKKEY, O_ORDERPRIORITY,
O_SHIPPRIORITY, O_ORDERSTATUS, O_TOTALPRICE,
LI_NO_OF_ITEMS, LI_SUM_OF_DISCOUNTS,
LI_SUM_OF_EXTENDEDPRICE, LI_SUM_OF_TAX, 1
    from ORDERS
    where C_CUSTKEY=1;
INSERT 0 183608939
insert into "ORDERS2"
    select O_ORDERKEY, -1* row number ( ) over (order by
O_ORDERKEY) as C_CUSTKEY, T_ORDERDATE,
N_CUSTOMER_NATION, C_CLERKKEY, O_ORDERPRIORITY,
O_SHIPPRIORITY, O_ORDERSTATUS, O_TOTALPRICE,
LI_NO_OF_ITEMS, LI_SUM_OF_DISCOUNTS,
LI_SUM_OF_EXTENDEDPRICE, LI_SUM_OF_TAX, 2
    from ORDERS
    where C_CUSTKEY=2;
INSERT 0 179667222
insert into "ORDERS2"
    select O_ORDERKEY, -1* row number ( ) over (order by
O_ORDERKEY) as C_CUSTKEY, T_ORDERDATE,
N_CUSTOMER_NATION, C_CLERKKEY, O_ORDERPRIORITY,
O_SHIPPRIORITY, O_ORDERSTATUS, O_TOTALPRICE,
LI_NO_OF_ITEMS, LI_SUM_OF_DISCOUNTS,
LI_SUM_OF_EXTENDEDPRICE, LI_SUM_OF_TAX, 3
    from ORDERS
    where C_CUSTKEY=3;
INSERT 0 77405173
insert into "ORDERS2"
    select O_ORDERKEY, -1* row number ( ) over (order by
O_ORDERKEY) as C_CUSTKEY, T_ORDERDATE,
N_CUSTOMER_NATION, C_CLERKKEY, O_ORDERPRIORITY,
O_SHIPPRIORITY, O_ORDERSTATUS, O_TOTALPRICE,
LI_NO_OF_ITEMS, LI_SUM_OF_DISCOUNTS,
LI_SUM_OF_EXTENDEDPRICE, LI_SUM_OF_TAX, 4
    from ORDERS
    where C_CUSTKEY=4;
INSERT 0 183626702
```

Typically, at this point, the old ORDERS table would be deleted and the ORDERS2 table would be renamed as the new ORDERS table.

(c) Accessing the Restructured Table Using a View

In one embodiment, the restructured table can be accessed using a view, instead of replacing the original table. The following exemplary SQL statements describe these steps:

```
create or replace view ORDERS_V (O_ORDERKEY,
C_CUSTKEY, T_ORDERDATE, N_CUSTOMER_NATION ,
C_CLERKKEY, O_ORDERPRIORITY, O_SHIPPRIORITY,
O_ORDERSTATUS, O_TOTALPRICE, LI_NO_OF_ITEMS,
LI_SUM_OF_DISCOUNTS, LI_SUM_OF_EXTENDEDPRICE,
LI_SUM_OF_TAX) as
    select O_ORDERKEY,
        case when SWITCH_KEY = 0 then C_CUSTKEY else
SWITCH_KEY end as C_CUSTKEY,
        T_ORDERDATE, N_CUSTOMER_NATION, C_CLERKKEY,
O_ORDERPRIORITY, O_SHIPPRIORITY, O_ORDERSTATUS,
O_TOTALPRICE, LI_NO_OF_ITEMS,
LI_SUM_OF_DISCOUNTS ,
LI_SUM_OF_EXTENDEDPRICE, LI_SUM_OF_TAX
    from ORDERS2 where SWITCH_KEY <>0
union all
    select O_ORDERKEY, C_CUSTKEY, T_ORDERDATE,
N_CUSTOMER_NATION, C_CLERKKEY, O_ORDERPRIORITY,
O_SHIPPRIORITY, O_ORDERSTATUS, O_TOTALPRICE,
LI_NO_OF_ITEMS, LI_SUM_OF_DISCOUNTS,
LI_SUM_OF_EXTENDEDPRICE, LI_SUM_OF_TAX
    from ORDERS2 where SWITCH_KEY = 0
```

In this instance, both the ORDERS and ORDERS2 tables remain available for subsequent RDBMS operations. Specifically, the original tables remain available for comparison with the restructured table.

Experimental Results

Below are the results of experiments performed using the present invention with a table ORDERS that had 1,200,000,000 rows and a table CUSTOMER that had 120,000,000 rows, and a data skew as indicated above.

In one experiment, the elapsed time for performing the following queries was compared for the skew table, the table following the decomposition according to the present invention, and the table with the rows distributed randomly:

| SQL Statements | Skew table | Proposed solution | Table distributed randomly |
| --- | --- | --- | --- |
| select count(*) from ORDERS; | 30 s | 5 s | 9 s |
| select distinct C_CUSTKEY, count(*) from orders group by C_CUSTKEY order by 2 desc limit 10; | 32 s | 9 s | 55 s |

-continued

| SQL Statements | Skew table | Proposed solution | Table distributed randomly |
|---|---|---|---|
| select C_NAME, count(*) from CUSTOMER c left outer join orders o on c.C_CUSTKEY = o.C_CUSTKEY group by 1 order by 2 desc limit 10; | 102 s | 77 s | 81 s |

As noted, the present invention out-performed both the skew table and the table with the rows distributed randomly.

In another experiment, various row distributions across the nodes were compared using the same database.

A first table was created with a random distribution:

```
create table ORDERS_random as select * from ORDERS
  distribute on random;
```

A second table was created with the C_CUSTKEY column (the skew column) as the distribution key and organized on another key (the O_ORDERKEY column):

```
create table ORDERS_organized_by_O_ORDERKEY as select *
from ORDERS distribute on (C_CUSTKEY) organize on
(O_ORDERKEY);
```

A third table was created with the C_CUSTKEY column (the skew column) as the distribution key and was organized on the same key (the C_CUSTKEY column):

```
create table ORDERS_organized_by_C_CUSTKEY as select *
from ORDERS distribute on (C_CUSTKEY) organize on
(C_CUSTKEY);
```

A fourth table was created with the C_CUSTKEY column (the skew column) as the distribution key and ordered by the same key (the C_CUSTKEY column):

```
create table ORDERS_ordered_by_C_CUSTKEY as select *
from ORDERS order by (C_CUSTKEY) distribute on (C_CUSTKEY);
```

Two different skews were generated for test purposes. One skew was a small skew where the 4 leading data values have less than 9% of the data for each value, as shown in the table below:

| GRP | GRP_PRCNT |
|---|---|
| 1 | 8.321084577518 |
| 4 | 8.1817729832041 |
| 3 | 8.0449779373267 |
| 2 | 6.934895800115 |

Another skew was a bigger skew with the 4 leading data values having greater than 13% for each value, as shown in the table below:

| GRP | GRP_PRCNT |
|---|---|
| 1 | 15.255982374894 |
| 3 | 13.870143118107 |
| 2 | 13.870045918088 |
| 4 | 13.868918131566 |

For both database and all tables (skewed table, view solution, random table, table organized by another key, table distributed and organized by column with skew and ordered table distributed by column with skew), the following queries were executed:

| No. | Query |
|---|---|
| 1 | select count(*) from orders |
| 2 | select distinct C_CUSTKEY, count(*) from orders group by C_CUSTKEY order by 2 desc limit 10 |
| 3 | select C_NAME, count(*) from CUSTOMER c left outer join orders o on c.C_CUSTKEY = o.C_CUSTKEY group by 1 order by 2 desc limit 10 |
| 4 | select N_CUSTOMER_NATION, C_CUSTKEY, count(*) from orders where C_CUSTKEY = 1 or C_CUSTKEY = 3 group by 2,1 |
| 5 | select count (*) from (select * from orders where C_CUSTKEY in (1, 2, 3, 4)) a |
| 6 | select count (*) from (select * from orders where C_CUSTKEY not in (1, 2, 3, 4)) a |
| 7 | select C_NAME, count(*) from CUSTOMER c left outer join orders o on c.C_CUSTKEY = o.C_CUSTKEY where N_CUSTOMER_NATION = 24 group by 1 order by 2 desc limit 10 |
| 8 | select C_NAME, count(*) from CUSTOMER c left outer join orders o on c.C_CUSTKEY = o.C_CUSTKEY where c.C_CUSTKEY in (1, 2, 3, 4, 124046590) group by 1 order by 2 desc limit 10 |

The results of these queries are shown in FIGS. 5A and 5B, wherein FIG. 5A shows the results for the bigger skew and FIG. 5B shows the results for the smaller skew.

As shown in the figures, the results of the tests introduce yet another requirement for solution, namely that it works better when the skew is higher (which is a parameter for the Skew Decomposer 112). If the skew is smaller (10% or less), then the performance is comparable to applying a random distribution on the skew table. For higher skew, the results show that the invention is 3-4 times faster than other solutions.

CONCLUSION

This concludes the detailed description of the invention. The following describes some alternative embodiments for accomplishing the present invention.

Those skilled in the art will recognize many modifications may be made to this configuration without departing from the scope of the present invention. Specifically, those skilled in the art will recognize that any combination of the above components, or any number of different components, including computer programs, peripherals, and other devices, may be used to implement the present invention, so long as similar functions are performed thereby.

For example, any type of computer, such as a mainframe, minicomputer, or personal computer, could be used with the present invention. In addition, many types of database management systems other than relational database management systems could benefit from the present invention. For example, any computer system that may support partitioning or partitioned databases may benefit from the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In summary, the present invention discloses a method, apparatus, and article of manufacture for optimizing database queries through the functionality of decomposition data skew in an asymmetric massively parallel processing database system. A table having data skew is restructured by: (1) storing original data values of a distribution key in a special switch column added to the table, (2) replacing the original data values of the distribution key with modified data values such as randomly generated data values, and (3) partitioning the rows of the table across the nodes of the asymmetric massively parallel processing database system based on the distribution key with the modified data values. The original data values that are stored and replaced may only comprise a subset of the original data values that cause the data skew in the table. Data skew is reduced, which improves performance, yet the original data values remain available, which reduces the impact for collocated joins.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of restructuring a table having data skew in a computer system, the computer system storing data from a database in partitions on one or more nodes of the computer system, the method comprising:
    determining whether original data values of a distribution key column of the table include frequent data values that cause data skew in the table;
    after the original data values of the distribution key column have been determined to include the frequent data values, copying only the original data values of the distribution key column that comprise the frequent data values to a switch column added to the table;
    after the original data values of the distribution key column that comprise the frequent data values have been copied to the switch column, replacing only the original data values in the distribution key column that comprise the frequent data values with modified data values that reduce the data skew in the table during partitioning, wherein the original data values that are copied and replaced comprise a subset of the original data values and the subset of the original data values comprises one or more of the frequent data values that cause the data skew in the table;
    after the original data values in the distribution key column that comprise the frequent data values have been replaced, partitioning the rows of the table across the nodes of the computer system using the distribution key column with the modified data values; and
    performing database operations other than the partitioning using the original data values, but not the modified data values.

2. The method of claim 1, wherein the subset causes the data skew in the table.

3. The method of claim 1, wherein the modified data values are randomly generated data values.

4. The method of claim 1, wherein metadata for the table indicates that the original data values of the distribution key are stored in the switch column added to the table.

5. An apparatus for restructuring a table having the data skew, comprising:
    a computer system for storing data from a database in partitions on one or more nodes of the computer system; and
    a process performed by the computer system, the process configured to:
        determine whether original data values of a distribution key column of the table include frequent data values that cause data skew in the table;
        after the original data values of the distribution key column have been determined to include the frequent data values, copy only the original data values that comprise the frequent data values of the distribution key column to a switch column added to the table;
        after the original data values of the distribution key column have been copied to the switch column, replace only the original data values in the distribution key column that comprise the frequent data values with modified data values that reduce the data skew in the table during partition, wherein the original data values that are copied and replaced comprise a subset of the original data values and the subset of the original data values comprises one or more of the frequent data values that cause the data skew in the table;
        after the original data values in the distribution key column that comprise the frequent data values have been replaced, partition the rows of the table across the nodes of the computer system using the distribution key column with the modified data values; and
        perform database operations other than the partition using the original data values, but not the modified data values.

6. The apparatus of claim 5, wherein the subset causes the data skew in the table.

7. The apparatus of claim 5, wherein the modified data values are randomly generated data values.

8. The apparatus of claim 5, wherein metadata for the table indicates that the original data values of the distribution key are stored in the switch column added to the table.

9. An article of manufacture comprising a computer readable storage medium encoded with computer program instructions which, when accessed by a computer system storing data from a database in partitions on one or more nodes of the computer system, cause the computer system to operate as a specially programmed computer system, executing a method for restructuring a table having the data skew, the method comprising:

determining whether original data values of a distribution key column of the table include frequent data values that cause data skew in the table;

after the original data values of the distribution key column have been determined to include the frequent data values, copying only the original data values of the distribution key column that comprise the frequent data values to a switch column added to the table;

after the original data values of the distribution key column have been copied to the switch column, replacing only the original data values in the distribution key column that comprise the frequent data values with modified data values that reduce the data skew in the table during partitioning, wherein the original data values that are copied and replaced comprise a subset of the original data values and the subset of the original data values comprises one or more of the frequent data values that cause the data skew in the table;

after the original data values in the distribution key column that comprise the frequent data values have been replaced, partitioning the rows of the table across the nodes of the computer system using the distribution key column with the modified data values; and performing database operations other than the partitioning using the original data values, but not the modified data values.

10. The article of claim 9, wherein the subset causes the data skew in the table.

11. The article of claim 9, wherein the modified data values are randomly generated data values.

12. The article of claim 9, wherein metadata for the table indicates that the original data values of the distribution key are stored in the switch column added to the table.

* * * * *